(12) United States Patent
Liu

(10) Patent No.: US 10,724,668 B2
(45) Date of Patent: Jul. 28, 2020

(54) REINFORCING CONNECTING ASSEMBLY FOR WATER PIPES

(71) Applicant: CRYOMAX COOLING SYSTEM CORP., Chunghua Hsien (TW)

(72) Inventor: Yan-Di Liu, Chunghua Hsien (TW)

(73) Assignee: CRYOMAX COOLING SYSTEM CORP., Chunghua Hsien (TW)

( * ) Notice: Subject to any disclaimer, the term of this patent is extended or adjusted under 35 U.S.C. 154(b) by 0 days.

(21) Appl. No.: 16/043,242

(22) Filed: Jul. 24, 2018

(65) Prior Publication Data

US 2019/0032834 A1    Jan. 31, 2019

(30) Foreign Application Priority Data

Jul. 25, 2017 (TW) .............................. 106210900 U

(51) Int. Cl.

| | |
|---|---|
| *F16L 9/00* | (2006.01) |
| *F16L 55/07* | (2006.01) |
| *F28D 1/053* | (2006.01) |
| *F28F 9/04* | (2006.01) |
| *F16L 3/223* | (2006.01) |
| *F16L 53/30* | (2018.01) |

(52) U.S. Cl.
CPC .............. *F16L 55/07* (2013.01); *F16L 3/223* (2013.01); *F16L 53/30* (2018.01); *F28D 1/05366* (2013.01); *F28F 9/04* (2013.01); *F16L 9/006* (2013.01); *F28F 2225/04* (2013.01)

(58) Field of Classification Search
CPC .................................. F16L 55/07; F16L 53/30

USPC ..................... 138/109, 110, DIG. 11, 90, 91
See application file for complete search history.

(56) References Cited

U.S. PATENT DOCUMENTS

| | | | | |
|---|---|---|---|---|
| 3,190,352 | A * | 6/1965 | Simpelaar | F28D 1/05383 165/134.1 |
| 5,431,218 | A * | 7/1995 | Lelievre | F28F 9/165 165/173 |
| 5,626,561 | A * | 5/1997 | Butler | A61F 2/022 604/500 |
| 7,857,009 | B2 * | 12/2010 | Groβ | F16L 3/1226 138/110 |
| 8,651,147 | B2 * | 2/2014 | Groβ | F16L 3/1226 138/110 |
| 2011/0030932 | A1 * | 2/2011 | Tucker | B21D 53/08 165/151 |

(Continued)

*Primary Examiner* — James F Hook
(74) *Attorney, Agent, or Firm* — Alan D. Kamrath; Karin L. Williams; Mayer & Williams PC

(57) ABSTRACT

A reinforcing connecting assembly is applied for a plurality of water pipes each of which includes a mouth portion defining an opening. The mouth portion includes a first curved portion. The reinforcing connecting assembly comprises a plurality of linking pieces and a connecting plate. Each of the linking pieces includes a connecting wall and two opposite side walls connected with the connecting wall. The connecting wall has a first surface abutting the first curved portion and a second surface opposite to the first surface. Each of the side walls includes a reinforcing portion. The reinforcing portions of the side walls are distant from each other and extend from two sides of the connecting wall toward a direction opposite to the first surface. The connecting plate connects the connecting wall of each of the linking pieces.

11 Claims, 6 Drawing Sheets

(56) References Cited

U.S. PATENT DOCUMENTS

| | | | |
|---|---|---|---|
| 2011/0258783 A1* | 10/2011 | Rickman | A61G 7/05769 5/710 |
| 2012/0031601 A1* | 2/2012 | Matter, III | F28D 1/05383 165/177 |
| 2015/0088033 A1* | 3/2015 | Locke | A61B 10/0096 600/573 |
| 2016/0290730 A1* | 10/2016 | Taras | F28D 1/0435 |

* cited by examiner

REINFORCING CONNECTING ASSEMBLY FOR WATER PIPES

BACKGROUND OF THE INVENTION

1. Field of the Invention

The present invention relates to a connecting structure and, more particularly, to a reinforcing connecting assembly for water pipes of a heatsink device.

2. Description of the Related Art

A conventional heatsink water tank in accordance with the prior art shown in FIG. 1 comprises a plurality of water pipes 5. Each of the water pipes 5 includes a mouth portion 52 defining an opening 53, and a body portion 51 connected to the mouth portion 52. The mouth portion 52 includes two opposite extensions 521, a first curved portion 522 connecting the two extensions 521, and a second curved portion 523 connecting the two extensions 521 and located opposite to the first curved portion 522. The two extensions 521, the first curved portion 522 and the second curved portion 523 define the opening 53. In fabrication, the first curved portion 522 is formed by bending a sheet plate whose two sides are juxtaposed and connected by soldering to form the second curved portion 523. Then, the mouth portion 52 is flared, so that the first curved portion 522 of the mouth portion 52 has a thickness smaller than that of the second curved portion 523 and the body portion 51. When the conventional heatsink water tank is mounted on a car to radiate and cool down the engine of the car, the water flows through the opening 53 into the mouth portion 52 and the body portion 51 of each of the water pipes 5, so that the first curved portion 522 is flushed by the water flow constantly. At this time, the first curved portion 522 has a smaller thickness and is subjected to a stress concentration, so that the first curved portion 522 easily forms cracks during a long period of time due to a direct hit of the water flow and an action of thermal expansion and contraction, thereby decreasing the lifetime of each of the water pipes 5.

BRIEF SUMMARY OF THE INVENTION

In accordance with the present invention, there is provided a reinforcing connecting assembly for water pipes, comprising a plurality of water pipes each of which includes a mouth portion defining an opening. The mouth portion includes two opposite extensions, a first curved portion connecting the two extensions, and a second curved portion connecting the two extensions and located opposite to the first curved portion. The two extensions, the first curved portion and the second curved portion define the opening. The reinforcing connecting assembly comprises a plurality of linking pieces and a connecting plate. Each of the linking pieces includes a connecting wall extending toward a first direction, and two opposite side walls connected with the connecting wall and extending toward a second direction perpendicular to the first direction. The connecting wall has a first surface abutting the first curved portion and a second surface opposite to the first surface. Each of the two side walls includes a reinforcing portion. The reinforcing portions of the two side walls are distant from each other and extend from two sides of the connecting wall toward a direction opposite to the first surface. The connecting plate connects the connecting wall of each of the linking pieces and adjoins the reinforcing portion.

Preferably, each of the two side walls further includes a guiding portion located opposite to the reinforcing portion and connected with the connecting wall, and an extending portion located between the reinforcing portion and the guiding portion and connected with the connecting wall. The guiding portions of the two side walls extend from two sides of the connecting wall toward a direction opposite to the first surface.

Preferably, the linking pieces and the connecting plate of the reinforcing connecting assembly are molded integrally.

According to the primary advantage of the present invention, the connecting wall and the reinforcing portions of each of the linking pieces guide the water flow in the first curved portion of each of the water pipes and avoid the water flow from directly flushing the first curved portion, thereby preventing the first curved portion from forming cracks due to direct hit of the water flow, and thereby enhancing the lifetime of the water pipes.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
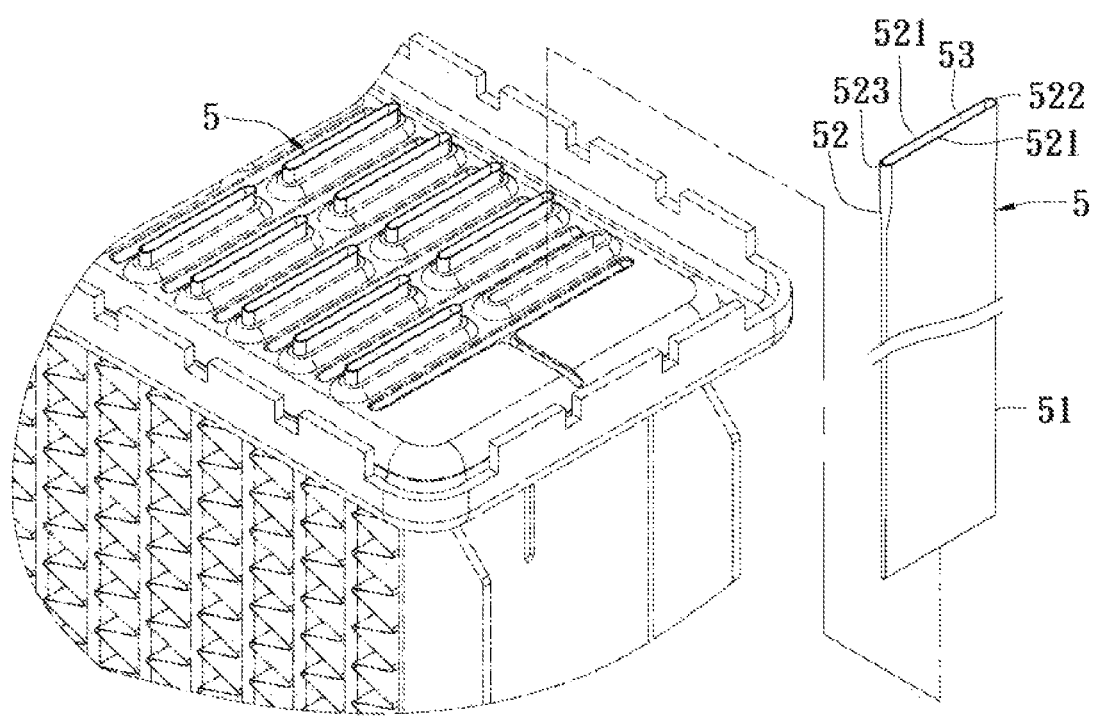
FIG. 1 is a perspective view of a conventional heatsink water tank in accordance with the prior art.

Referring to FIGS. 2-6, a reinforcing connecting assembly 1 in accordance with the preferred embodiment of the present invention is applied on a plurality of (preferably ten) water pipes 2 of a heatsink device (such as a heatsink water tank).

Each of the water pipes 2 includes a mouth portion 21 defining an opening 22, and a body portion 23 connected to the mouth portion 21. The mouth portion 21 includes two opposite extensions 211, a first curved portion 212 connecting the two extensions 211, and a second curved portion 213 connecting the two extensions 211 and located opposite to the first curved portion 212. The two extensions 211, the first curved portion 212 and the second curved portion 213 define the opening 22. The first curved portion 212 is formed by bending a sheet plate whose two sides are juxtaposed and connected to form the second curved portion 213.

The reinforcing connecting assembly 1 comprises a plurality of (preferably five) linking pieces 11 and a connecting plate 12. Each of the linking pieces 11 includes a connecting wall 111 extending toward a first direction "D1", and two opposite side walls 112 connected with the connecting wall 111 and extending toward a second direction perpendicular to the first direction "D1". The connecting wall 111 has a first surface 113 and a second surface 114 opposite to the first surface 113. Each of the two side walls 112 includes a reinforcing portion 115 connected with the connecting wall 111, a guiding portion 116 located opposite to the reinforcing portion 115 and connected with the connecting wall 111, and an extending portion 117 located between the reinforcing portion 115 and the guiding portion 116 and connected with the connecting wall 111. The reinforcing portions 115 of the two side walls 112 are distant from each other and extend from two sides of the connecting wall 111 toward a direction opposite to the first surface 113. The guiding portions 116 of the two side walls 112 extend from two sides of the connecting wall 111 toward a direction opposite to the first surface 113. The connecting plate 12 connects the connecting wall 111 of each of the linking pieces 11 and adjoins the reinforcing portion 115.

In the preferred embodiment of the present invention, the linking pieces 11 and the connecting plate 12 of the reinforcing connecting assembly 1 are molded integrally.

Figure 2:
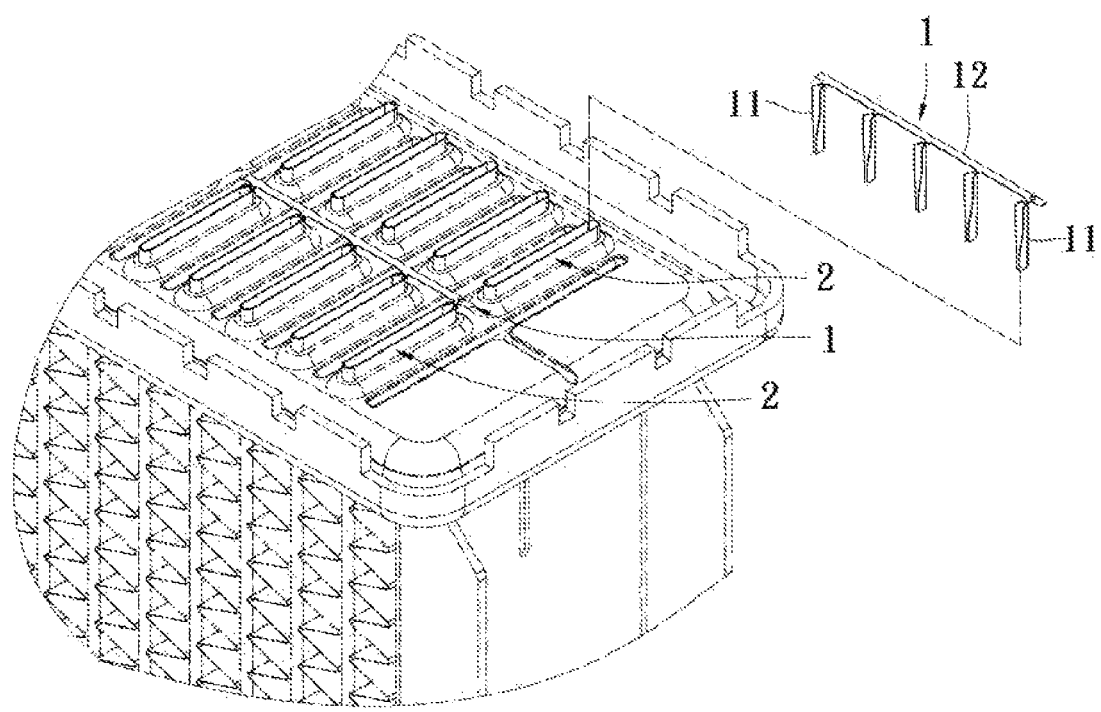
FIG. 2 is a partially exploded perspective view showing a reinforcing connecting assembly and a plurality of water pipes in accordance with the preferred embodiment of the present invention.
Figure 3:
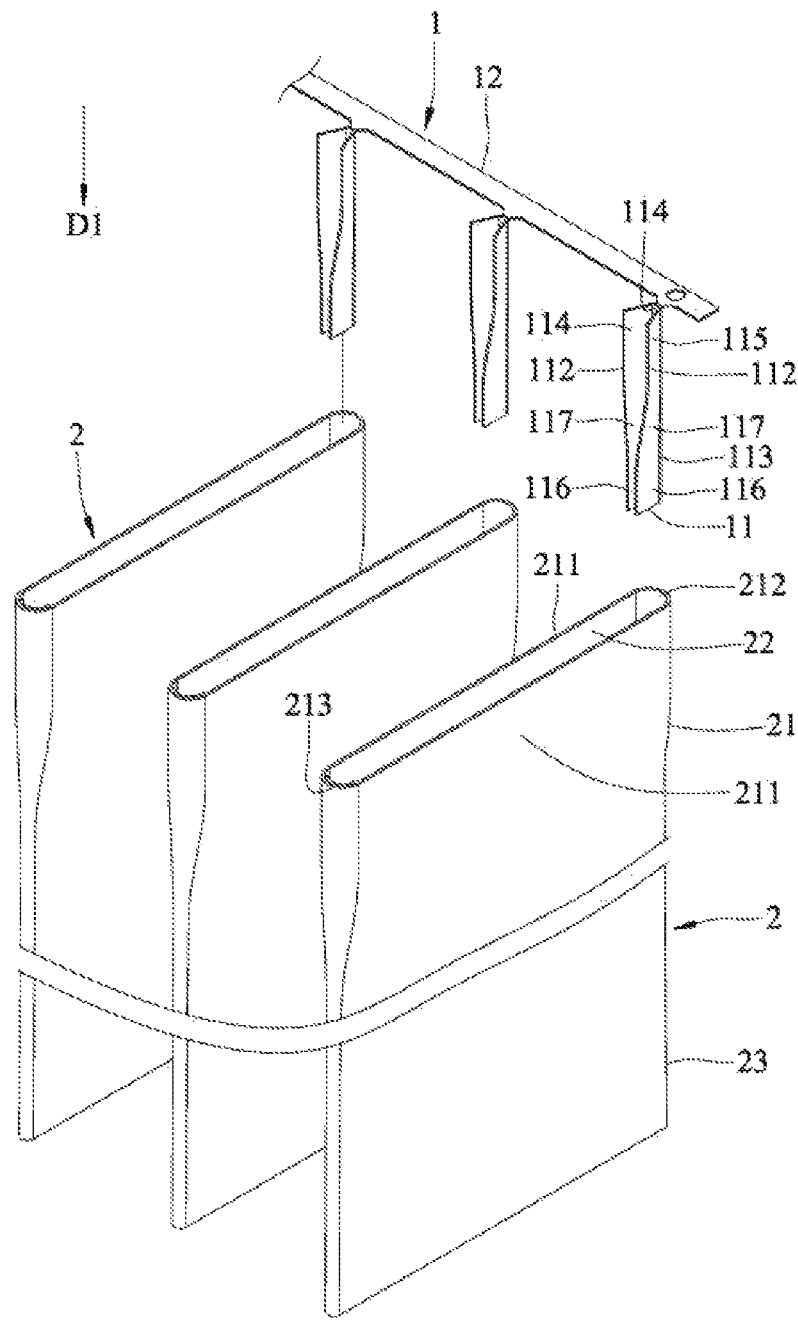
FIG. 3 is a partially exploded perspective view showing the reinforcing connecting assembly and the water pipes in accordance with the preferred embodiment of the present invention.
Figure 4:
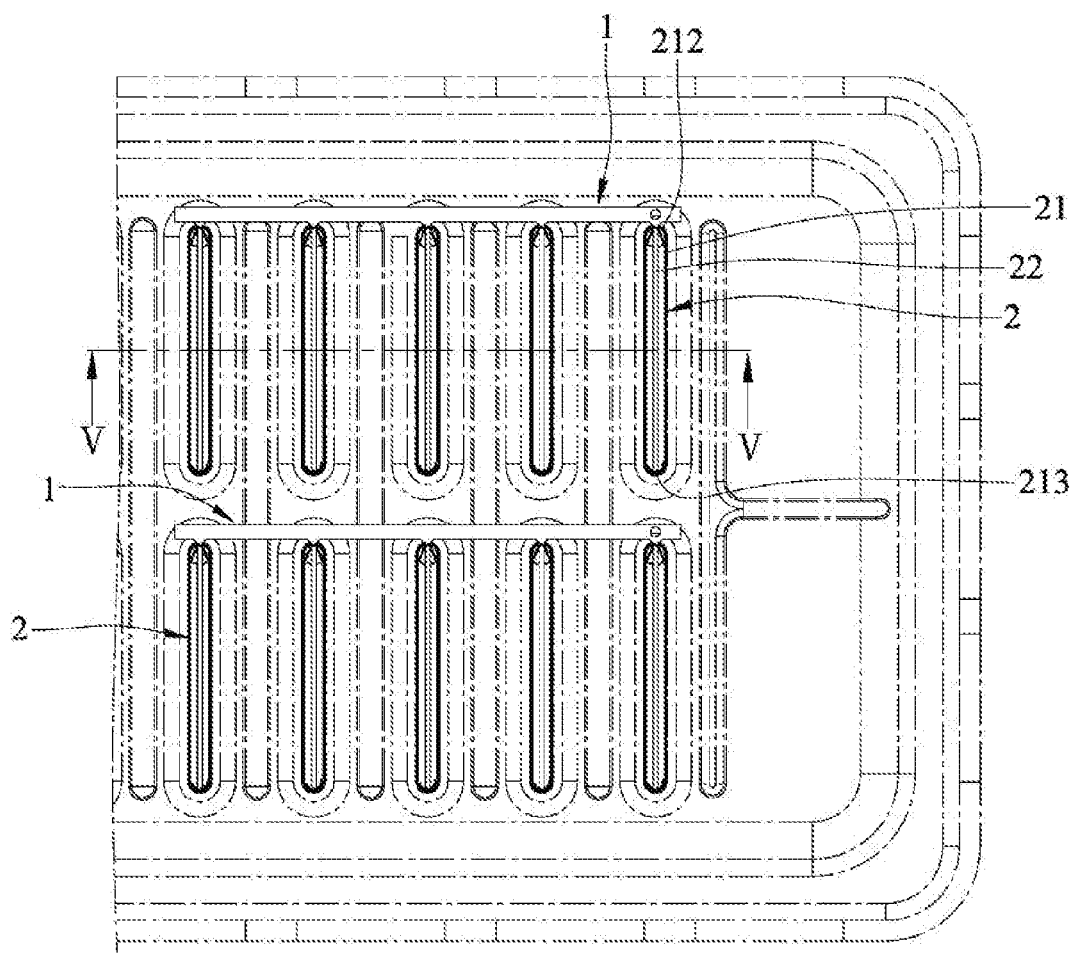
FIG. 4 is a top view showing assembly of the reinforcing connecting assembly and the water pipes in accordance with the preferred embodiment of the present invention.
Figure 5:
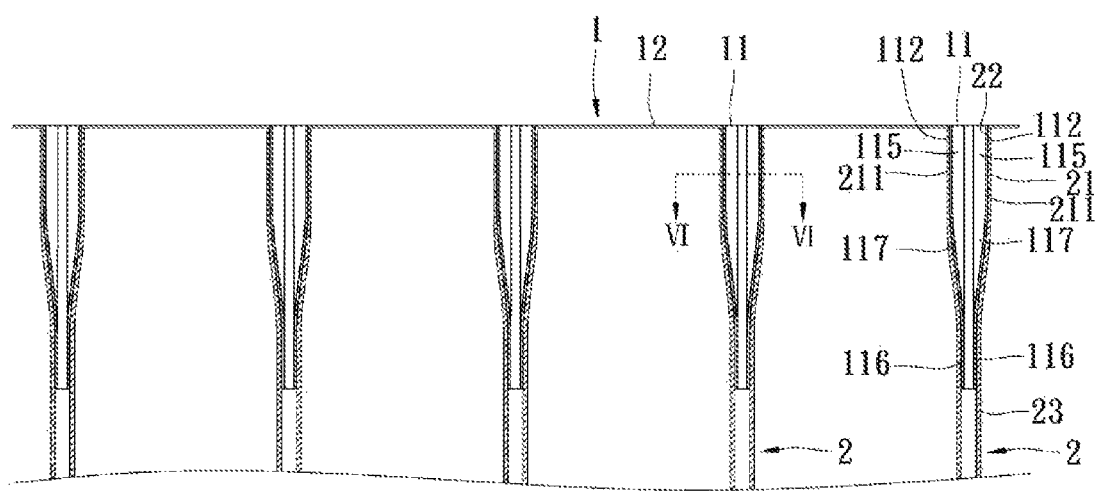
FIG. 5 is a cross-sectional view of the reinforcing connecting assembly and the water pipes taken along line V-V as shown in FIG. 4.
Figure 6:
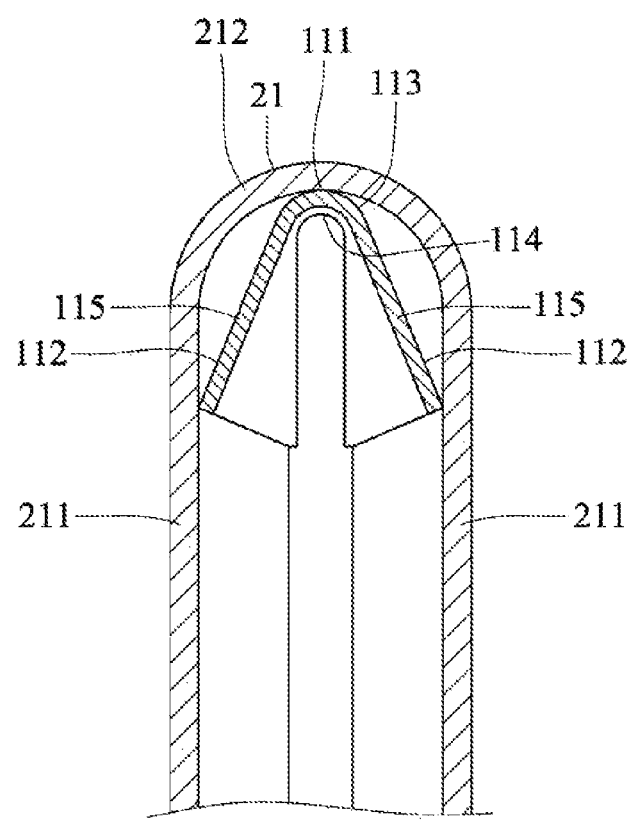
FIG. 6 is a cross-sectional view of the reinforcing connecting assembly and the water pipes taken along line VI-VI as shown in FIG. 5.

In assembly, referring to FIGS. 4-6 with reference to FIGS. 2 and 3, the reinforcing connecting assembly 1 is provided with a solder material. The connecting plate 12 of the reinforcing connecting assembly 1 is held by the operator, and each of the linking pieces 11 of the reinforcing connecting assembly 1 is inserted through the opening 22 into the mouth portion 21 of each of the water pipes 2 and extends to the body portion 23. At this time, the first surface 113 of the connecting wall 111 of each of the linking pieces 11 abuts the first curved portion 212 of the mouth portion 21 and the body portion 23, the reinforcing portions 115 of the two side walls 112 of each of the linking pieces 11 rest on the two extensions 211 of the mouth portion 21, while the extending portions 117 and the guiding portions 116 of the two side walls 112 of each of the linking pieces 11 rest on the body portion 23. Finally, the connecting plate 12 is placed outside of the opening 22 of each of the water pipes 2. After the reinforcing connecting assembly 1 is assembled, the reinforcing connecting assembly 1 together with the heatsink device is placed into a brazier and heated, so that the reinforcing connecting assembly 1 is combined with the water pipes 2 by brazing. When the heatsink device soldered with the reinforcing connecting assembly 1 is operated, the connecting wall 111 and the reinforcing portions 115 of the two side walls 112 of each of the linking pieces 11 guide the water flow in the first curved portion 212 of each of the water pipes 2 and avoid the water flow from directly flushing the first curved portion 212, thereby preventing the first curved portion 212 from being worn out or broken due to the direct hit of the water flow or the action of thermal expansion and contraction, and thereby enhancing the lifetime of the water pipes 2. Then, the connecting wall 111, the guiding portions 116 and the extending portions 117 of each of the linking pieces 11 guide the water flow to the body portion 23 of each of the water pipes 2. At this time, the guiding portions 116 and the extending portions 117 of each of the linking pieces 11 are soldered to the body portion 23 of each of the water pipes 2, to enhance the stability of each of the linking pieces 11, thereby reinforcing each of the water pipes 2. In addition, the connecting plate 12 of the reinforcing connecting assembly 1 connects the linking pieces 11, and the linking pieces 11 are brazed to the water pipes 2, so that the water pipes 2 are secured by the linking pieces 11 and the connecting plate 12 of the reinforcing connecting assembly 1 and will not produce vibration.

Accordingly, the connecting wall 111 and the reinforcing portions 115 of each of the linking pieces 11 guide the water flow in the first curved portion 212 of each of the water pipes 2 and avoid the water flow from directly flushing the first curved portion 212, thereby preventing the first curved portion 212 from forming cracks due to direct hit of the water flow, and thereby enhancing the lifetime of the water pipes 2. In addition, each of the linking pieces 11 reinforces each of the water pipes 2, without having to provide much material for reinforcing each of the water pipes 2, thereby saving the cost of material.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A reinforcing connecting assembly for water pipes, comprising:
    a plurality of water pipes each of which includes a mouth portion defining an opening;
    the mouth portion including two opposite extensions, a first curved portion connecting the two extensions, and a second curved portion connecting the two extensions and located opposite to the first curved portion;
    the two extensions, the first curved portion and the second curved portion defining the opening;
    wherein:
    the reinforcing connecting assembly further comprises a plurality of linking pieces and a connecting plate;
    each of the linking pieces corresponds to one of the water pipes;
    each of the linking pieces includes a connecting wall extending toward a first direction, and two opposite side walls connected with the connecting wall and extending toward a second direction perpendicular to the first direction;
    the connecting wall has a first surface abutting the first curved portion and a second surface opposite to the first surface;
    each of the two side walls includes a reinforcing portion;
    the reinforcing portions of the two side walls are distant from each other and extend from two sides of the connecting wall toward a direction opposite to the first surface; and
    the connecting plate connects the connecting wall of each of the linking pieces and adjoins the reinforcing portion.

2. The reinforcing connecting assembly of claim 1, wherein:
    each of the two side walls further includes a guiding portion located opposite to the reinforcing portion and connected with the connecting wall, and an extending portion located between the reinforcing portion and the guiding portion and connected with the connecting wall; and
    the guiding portions of the two side walls extend from two sides of the connecting wall toward a direction opposite to the first surface.

3. The reinforcing connecting assembly of claim 1, wherein the linking pieces and the connecting plate of the reinforcing connecting assembly are molded integrally.

4. The reinforcing connecting assembly of claim 1, wherein each of the linking pieces is located in and surrounded by one of the water pipes.

5. The reinforcing connecting assembly of claim 1, wherein each of the linking pieces has a V-shaped cross-sectional profile.

6. The reinforcing connecting assembly of claim 1, wherein the connecting plate straddles the water pipes.

7. The reinforcing connecting assembly of claim 1, wherein the connecting plate rests on the mouth portion of each of the water pipes.

8. The reinforcing connecting assembly of claim 1, wherein the water pipes are positioned by the linking pieces and the connecting plate.

9. The reinforcing connecting assembly of claim 1, wherein the connecting wall and the reinforcing portions of the two side walls of each of the linking pieces guide a water flow in the first curved portion of each of the water pipes and avoid the water flow from directly flushing the first curved portion.

10. The reinforcing connecting assembly of claim 1, wherein the connecting plate is perpendicular to each of the linking pieces.

11. The reinforcing connecting assembly of claim 1, wherein the linking pieces are parallel with each other.

* * * * *